Oct. 4, 1949.   C. COLE   2,483,881

ANIMAL TRAP

Filed April 4, 1947

INVENTOR.
CLAY COLE
BY Clifford C. Bradbury
ATTORNEY

Patented Oct. 4, 1949

2,483,881

UNITED STATES PATENT OFFICE 2,483,881

ANIMAL TRAP

Clay Cole, Richmond, Ind.

Application April 4, 1947, Serial No. 739,375

15 Claims. (Cl. 43—96)

This invention relates to the art of trapping fur-bearing animals, and particularly those animals whose habits of feeding make it possible for them to be trapped along the shores of streams and lakes, or wherever there is water in which their food may be found.

Among the animals of this class whose pelts are particularly valuable as furs are the beaver, the otter, the mink, the muskrat and the raccoon, and in these animals the instinct of self-preservation is so strong that when one of them finds itself caught in a trap it will, in a great many cases, release itself by gnawing off a limb, or by pulling it off, thus escaping the trap at the expense of the permanent maiming of the animal.

It is the object of this invention to humanely destroy the animal so trapped, and also to save the pelt before the animal is able to disengage itself from the trap.

In accordance with this invention, I provide a mechanism whereby when an animal is caught in a trap located adjacent the shore of a stream, lake or other body of water, the operation of springing the trap, or the first struggle, will cause the animal to be drawn into the water where it will be impossible for it to either gnaw the entrapped member, or to obtain sufficient leverage to pull away from the trap before it is drowned.

In accordance with one feature of this invention, I provide a spring operated retractor to one end of which the animal trap is attached, the other end being adapted to be anchored in water which is sufficiently deep to drown the animal.

Another feature of this invention comprises a triggering arrangement operated in response to the struggles of the trapped animal to bring about the operation of the device.

In the drawing illustrating this invention,

Figure 1:
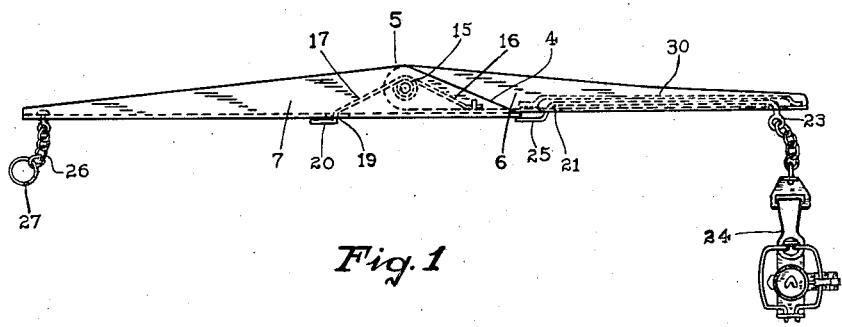
Fig. 1 is a view in side elevation of the device, showing a trap attached to one end thereof.
Figure 2:
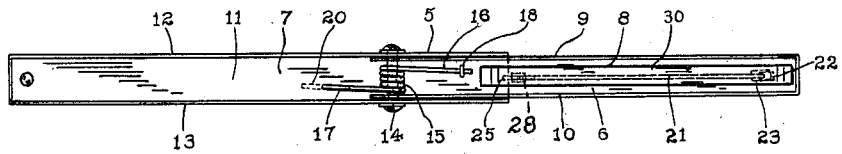
Fig. 2 is a plan view of the device in open position.
Figure 3:
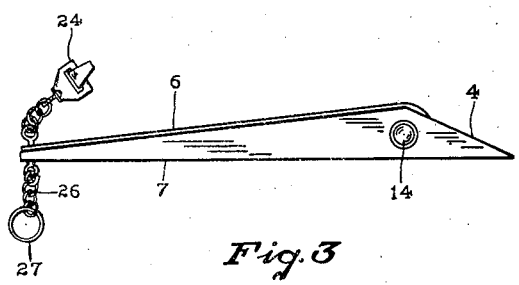
Fig. 3 is a view in side elevation of the device in operated position.
Figure 4:
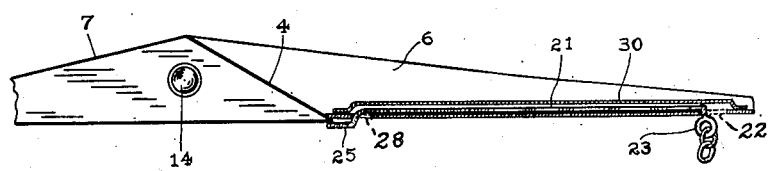
Fig. 4 is a fragmentary elevation with parts in section illustrating a triggering arrangement for the device.

In the drawings, a retractor 5 comprises two metal channel members 6 and 7. Member 6 includes a bottom plate 8 and two integral side plates 9 and 10 which are tapered from the center of the device 5 to their outer ends. The member 7 includes a bottom plate 11 and two side plates 12 and 13 which are likewise tapered from the center of the member 5 outwardly to their ends. The member 7 is wider between its side plates than the member 6 so that when brought together in jackknife relation, the member 6 will lie within the member 7. The large end of the channel member 7 is formed with a heel 4, which embraces the adjacent end of the channel 6 and extends for a distance along the outer face 8 thereof. This overlapping relation of the channel members 6 and 7 limits the possible angular displacement of these members to 180 degrees and provides one part of the latch for holding the retractor in extended position.

The members 6 and 7 are secured together at their larger ends in overlapping relation by means of a pivot 14, surrounded by a spring 15, the opposite ends 16 and 17 of which are secured to the channel shaped members 6 and 7, respectively. The end 16 is secured to the plate 8 by means of a fastening lug 18, while the end 17 of the spring extends through a slot 19 in the plate 11, and has its end 20 turned over along the outside of the plate. The slot in the plate 7 is of sufficient length to allow for relative movement of the end of the spring and the plate. The end 17 is made sufficiently long that it will not be withdrawn through the slot by the action of the spring.

A trigger 21 extends along the inner face of the plate 8 and has its outer end turned outwardly through a slot 22 at the end of the member 6. A ring 23, to which an animal trap 24 is attached, is formed on the end of the trigger 21, extending through the slot 22.

At its opposite end the trigger 21 is bent outwardly to extend through a slot 28 near the adjacent end of the member 7, and is provided with an extension 25 which lies parallel with the plate 6 and extends over the lower face of the member 7 to retain the members 6 and 7 in locked position.

A chain 26 is attached to the end of the member 7 and is provided with a ring or other securing means 27 for anchoring the device in deep water away from the shore of the stream or lake.

In the operation of the mechanism, the struggle of an animal springing the trap 24 will operate the trigger 21 to withdraw the latch 25 from engagement with the inner face of member 7 and the end of the member 6 to which the trap 24 is attached will be thrown over in response to the action of the spring 15 to bring the trap adjacent to the anchored end of the member 7, thus depositing the trapped animal in the deeper water in which this end of the retractor 5 is anchored.

The members 6 and 7 may be approximately nine inches long, thus giving a total swinging movement to the trap of approximately eighteen inches. Where the shallow water extends outwardly some distance from the shore, the length of the members 6 and 7 may be increased, or the deeper water may be reached by hooking two or more of the retractors in tandem so that the operation of one of the retractors will trip all of the devices, thus carrying the trapped animal to water of sufficient depth to accomplish the purpose of this invention.

A retaining strip 30 is provided to prevent displacement of the rod 21 by movement of the member 6 when the trap is sprung. The strip which is formed of flat metal is of a width and length to span the rod 21 both transversely and longitudinally, and it has its ends bent over and secured to the face of the member 6 by spot welding.

Because of their channel configuration, the members 6 and 7 are sufficiently strong that they may be formed of relatively light gauge steel to keep the weight at a minimum, or they may be made of aluminum or other suitable material.

Although I have shown and described my invention with respect to certain details of construction, I wish it to be understood that I am not to be too closely limited thereto, many modifications being possible without departing from the spirit or scope of my invention.

I claim:

1. An apparatus for causing the drowning of animals trapped adjacent the shore line of a body of water, comprising a pair of hinged arms, a spring for urging the outer ends of the arms toward each other, a latch for normally retaining the arms in extended position, anchoring means attached to the end of one arm for anchorage in deep water, and an animal trap attached to the latch at the shore end of the device for disengaging the latch in response to the pull of an animal captured by the trap.

2. An apparatus for causing the drowning of animals trapped adjacent the shore line of a body of water, said apparatus comprising a pair of arms hinged together in end to end relation, a spring attached to the two members and tensioned to swing the outer ends of said members toward each other, a latch engaging the adjacent ends of the arms to retain them in unsprung relation, an anchoring attachment secured to the free end of one of the arms, and an animal trap secured to the latch adjacent the free end of the other arm.

3. In an apparatus for causing the drowning of animals trapped adjacent the shore line of a body of water, a pair of longitudinally extending arms, a pivotal member for connecting adjacent ends of said arms in hinged relation, a spring attached to the adjacent ends of said arms and normally tending to swing the free ends of said arms toward each other, an attachment at the free end of one of said arms for securing it in deep water off shore, a triggering member extending longitudinally of the other member with one end in latching engagement with the adjacent end of the two members and its opposite end adjacent the shore line, and an animal trap secured to the shore line end of the triggering member.

4. In an apparatus for causing the drowning of animals trapped adjacent the shore line of a body of water, a pair of channel members pivotally secured together with their adjacent ends in overlapping relation, a spring attached at its ends to adjacent portions of the channel members and tensioned to swing the free ends of the channel members toward each other, a triggering member having one end in latching engagement with the adjacent ends of the channel members and its outer end terminating adjacent the outer end of one of said members, and an animal trap attached to the trigger member.

5. In an apparatus for causing the drowning of animals trapped adjacent the shore line of a body of water, a retractor comprising a pair of channel members pivotally secured together at their ends in overlapping relation, one of said members being provided with a slot in its lower face adjacent its pivoted end, a spring for swinging the outer ends of the channel members toward each other, a latch extending longitudinally of the slotted member and movable with respect thereto, an extension on the inner end of the latch extending through the slot and into latching engagement with a face of the other channel member, and an animal trap connected with the outer end of the latch.

6. In an apparatus for causing the drowning of animals trapped adjacent the shore line of a body of water, a retractor comprising a pair of spring impelled channel members pivotally secured together at their ends, one of said members being provided with a heel underlying the adjacent end of the other member, and the other member being provided with an opening adjacent the end of the heel, a longitudinally movable rod lying within that member provided with the opening, an angular extension on one end of the rod extending through the opening into latching engagement with the heel portion of the other member, and an animal trap connected with the opposite end of the longitudinally movable rod.

7. In an apparatus for causing the drowning of animals trapped adjacent the shore line of a body of water, a retractor comprising a pair of spring impelled channel members pivotally connected at their adjacent ends, one of said members being provided with a heel underlying the adjacent end of the other member, and the other member being provided with a slot through its lower portion adjacent the end of the heel on the other member, a longitudinally movable rod extending for substantially the length of the inner face of the slotted member and provided with an angular portion extending through the slot into latching engagement with the heel portion of the other member, retaining means for the rod secured to the lower face of the slotted member, and an animal trap attached to the end of the rod away from the latch end.

8. In an apparatus for causing the drowning of animals trapped adjacent the shore line of a body of water, a retractor comprising a pair of spring impelled channel members pivotally connected at their adjacent ends, one of said members being provided with a heel underlying the adjacent end of the other member, and the other member being provided with a slot in its lower portion adjacent the heel portion of the first member, a longitudinally movable rod lying along the lower inner face of the slotted member and provided with a latching portion extending through the slot into engagement with the heel portion of the other member, a longitudinally extending retaining strip for the rod secured to the lower inner face of the slotted member, and an animal trap secured to the outer end of the rod.

9. In an apparatus for causing the drowning of animals trapped along the shore line of a body of water, a retractor comprising two spring impelled channel members of different widths adapted to fold into jacknife relation, a pivotal connection for the adjacent ends of said members, a heel formed on one end of the wider member adapted to underlie the adjacent end of the narrower member beyond the pivot, the narrower member being provided with slots through its lower face at opposite ends thereof, a longitudinally movable rod lying along the lower face of the narrower member with its opposite ends extending through the slots, a latch on the end of the rod adjacent the pivot for engaging a face of the heel, and an animal trap attached to the opposite end of the rod.

10. In an apparatus for causing the drowning of animals trapped adjacent the shore line of a body of water, a retractor comprising two spring impelled channel members of different widths adapted to fold into jackknife relation, a pivot connecting the adjacent ends of said members, a longitudinally movable trigger member extending along the inner face of the narrower member, and a retaining strip for the trigger member extending above said trigger member with its ends attached to the narrower member beyond the ends of the trigger member.

11. An apparatus for causing the drowning of trapped animals, comprising a pair of spring tensioned arms connected to fold together, a rod for retaining the arms separated against the spring tension, a deep water anchor for one end of the apparatus, an animal trap located at the land end of the apparatus, and connections between the animal trap and one end of the retaining rod for releasing it by the struggles of a trapped animal.

12. An apparatus for causing the drowning of animals trapped adjacent the shore line of a body of water, comprising a pair of spring tensioned arms connected to fold together, latching means for normally retaining the arms in extended position, deep water anchoring means connected to one end of the apparatus, and an animal trap attached to the latching means at the shore end for releasing the spring tensioned arms.

13. An apparatus for causing the drowning of trapped animals, comprising a pair of spring tensioned arms connected to fold together, a rod for retaining the arms separated against the spring tension, a deep water anchor for one end of the apparatus, an animal trap connected with the land end of the apparatus, and means responsive to a longitudinal pull on the apparatus for releasing the retaining rod.

14. Means for causing the drowning of animals trapped adjacent the shore line of a body of water, comprising a pair of movable arms of substantially equal lengths spring tensioned to fold together, a rod for normally holding the arms in extended position, an offshore anchor to which one end of the apparatus is attached, an animal trap connected to the inshore end of the apparatus, and connections between the retaining rod and the arms released by a longitudinal pull on the rod to permit the arms to fold together.

15. An apparatus for causing the drowning of animals trapped adjacent the shore line of a body of water comprising in combination a pair of extended arms spring tensioned to fold together, anchoring means attached to the extended end of one of the arms for anchoring it in deep water off shore, a latching device movable with the extended end of the other arm for holding the arms in extended position, and an animal trap attached to one end of the latching device to trip the arms when an animal is captured by the trap.

CLAY COLE.

REFERENCES CITED

The following references are of record in the file of this patent:

UNITED STATES PATENTS

| Number | Name | Date |
| --- | --- | --- |
| 1,996,704 | Hawkinson | Apr. 2, 1935 |
| 2,233,380 | Claytor | Feb. 25, 1941 |
| 2,252,405 | Navin | Aug. 12, 1941 |